United States Patent
Westhoff

[11] Patent Number: 5,971,879
[45] Date of Patent: Oct. 26, 1999

[54] BELT REINFORCING MATERIAL AND BELT CONSTRUCTED THEREWITH

[75] Inventor: William L. Westhoff, Denver, Colo.

[73] Assignee: The Gates Corporation, Denver, Colo.

[21] Appl. No.: 08/837,857

[22] Filed: Apr. 22, 1997

[51] Int. Cl.[6] ................................................. F16C 1/00
[52] U.S. Cl. ..................... 474/260; 474/267; 474/205; 442/35; 161/81
[58] Field of Search .................. 474/260, 261, 474/205, 262, 263, 268, 267, 250; 161/50, 154; 156/137, 138, 139, 140, 141, 142; 442/57, 35, 181, 239, 240, 268, 270; 264/46.4

[56] References Cited

U.S. PATENT DOCUMENTS

| | | | |
|---|---|---|---|
| 3,121,656 | 2/1964 | Gluck | 442/35 |
| 3,312,584 | 4/1967 | Charlton et al. | 161/81 |
| 3,395,065 | 7/1968 | Owen, Sr. | 161/50 |
| 3,620,897 | 11/1971 | Tanimoto et al. | 161/154 |
| 3,962,511 | 6/1976 | Foti | 156/137 X |
| 3,964,328 | 6/1976 | Redmond . | |
| 3,996,813 | 12/1976 | Henderson et al. | 474/261 X |
| 4,099,422 | 7/1978 | Cicognai et al. . | |
| 4,177,688 | 12/1979 | Howerton et al. | 156/142 X |
| 4,235,119 | 11/1980 | Wetzel . | |
| 4,392,842 | 7/1983 | Skura et al. . | |
| 4,605,389 | 8/1986 | Westhoff . | |
| 4,657,526 | 4/1987 | Tangorra et al. | 474/261 |
| 4,895,555 | 1/1990 | Watanabe et al. . | |
| 5,362,281 | 11/1994 | Dutton et al. | 474/261 X |
| 5,427,637 | 6/1995 | Mishima et al. | 156/137 |
| 5,536,214 | 7/1996 | Akita et al. . | |
| 5,645,504 | 7/1997 | Westoff | 474/260 X |
| 5,800,749 | 9/1998 | Lewit et al. | 264/46.4 |

*Primary Examiner*—Tamara L. Graysay
*Assistant Examiner*—Marcus Charles
*Attorney, Agent, or Firm*—C. H. Castleman, Esq.; H. W. Oberg, Esq.; S. G. Austin, Esq.

[57] ABSTRACT

A belt reinforcing material of at least two layers where one layer is a twined fabric and the other layer is a woven fabric that are attached to each other such as by needle-punching. A toothed power transmission belt with a plurality of teeth spaced along one side of the belt includes the aforementioned fabric disposed at a peripheral surface that includes the belt teeth.

18 Claims, 1 Drawing Sheet

BELT REINFORCING MATERIAL AND BELT CONSTRUCTED THEREWITH

BACKGROUND OF THE INVENTION

The invention relates to a belt reinforcing fabric, but more particularly, the invention relates to a reinforcing fabric particularly useful in reinforcing belt teeth and a toothed power transmission belt made with such fabric.

Toothed power transmission belts have a polymeric body such as of a rubber, thermoplastic, or urethane, with a plurality of teeth formed along at least one side of such belts. A tensile member is typically embedded in a body as a load carrying member. It is preferred to have the belt teeth reinforced with a fibrous material to enhance their shear strength and wear-resistance, or to alter their coefficient of friction for engagement with a toothed pulley. Wear-resistant fabrics for belts are of a woven type such as a canvas, a crimped stretchable nylon, and a leno-weave, etc., and may be of a knit fabric such as a 1×1 rib knit. Such fabrics are disposed in the belt at a peripheral surface that includes the belt teeth and may be in the form of single layer fabrics, multiple layers of woven fabrics, bonded layers of fabrics, and fabrics with an outer layering of an impervious thermoplastic film.

Other fabric reinforcements for reinforcing belt teeth may be of the non-woven type and include a web of discontinuous fibers or a web of fibers that are bonded together by thermal or chemical bonding or needle-punching in known fashion to form a non-woven fabric. Such non-woven belt fabrics are typically embedded in a belt body and may be used to help locate a belt's pitch line diameter (PLD) for a spirally wound tensile cord at lands located between spaced belt teeth. The fabrics are sometimes in an expanded form near a middle portion of the belt tooth where they act as a tooth reinforcement. With some non-woven fabrics, it is difficult to control a requisite thickness for maintaining an acceptable PLD. Some non-woven fabrics are difficult to handle and position at a desired location within belt teeth because of processing limitations of belt manufacture. Examples of fabric reinforcements for belts and belts reinforced therewith are disclosed in the following patents:

U.S. Pat. No. 3,964,328 (Redmond) discloses a fabric in the preferable form of a stretchable nylon with a thermoplastic layer such as polyethylene bonded to an exterior surface thereof. The fabric is disposed at a peripheral surface of a belt including belt teeth as a wear-resistant fabric and friction modifying reinforcement.

U.S. Pat. No. 4,099,422 (Cicognai et al.) discloses a rubberized fabric. Two layers of the fabric are disposed along a peripheral surface of a belt including belt teeth for wear-resistance and rigidifying the belt teeth.

U.S. Pat. No. 4,235,119 (Wetzel) discloses a fabric disposed along a peripheral surface of a belt including belt teeth as a wear-resistant fabric. Discontinuous fibers are compounded into a rubber elastomer of a belt body and are located adjacent the fabric and a tensile member for rigidifying the belt teeth.

U.S. Pat. No. 4,605,389 (Westhoff) discloses a fabric of the type as used in Redmond '328. The fabric is disposed along a peripheral surface of a belt including spaced belt teeth where the belt teeth are configured flank surfaces having a tractrix curve shape.

U.S. Pat. No. 4,895,555 (Watanabe et al.) discloses a web of non-woven fabric. The non-woven fabric is used as a reinforcement with a cast urethane belt body and is compressed under a tensile member in a land area of a belt and is diffused in belt teeth as a reinforcing fiber for improving the shear strength of the teeth.

U.S. Pat. No. 5,362,281 (Dutton) discloses a double woven fabric with two sets of warp yarns and two sets of weft yarns that are tied together to form a single fabric layer. The fabric is used as a reinforcement and is disposed along a peripheral surface of the belt including belt teeth as a wear-resistant fabric and a reinforcement member. The fabric also operates to help locate tensile members of the belt for controlling PLD.

U.S. Pat. No. 4,392,842 (Skura et al.) discloses a stretchable fabric reinforcement. The reinforcement is used in two layers of a toothed belt where one layer is disposed at a peripheral surface including the belt teeth and the other layer is embedded as a suspended layer in the belt teeth as a reinforcement.

U.S. Pat. No. 5,536,214 (Akita et al.) discloses a non-woven fabric where in the prefered form, it is needle punched which bonds discontinuous fibers of the fabric together by entangling some fibers. The non-woven fabric is used as an embedded reinforcement in a toothed belt body of cast urethane. The fabric is disposed in the belt body in a land area between belt teeth where it is compressed to help control PLD and in the belt teeth where it is expanded and serves as an embedded reinforcement for the belt teeth.

SUMMARY OF THE INVENTION

In accordance with the invention, a belt reinforcing material is provided comprising two layers of textile material that are attached to each other. One of the layers is in the form of a twined fabric such as a woven fabric that preferably is stretchable at least along one axis of the fabric. A layer of non-woven material is attached to the twined fabric layer such as by needle-punching.

A toothed power transmission belt also in accordance with the invention is of the type with a polymeric body and a plurality of spaced teeth along at least one side of the belt. The belt includes a wear-resistant fabric disposed at a peripheral surface that includes the belt teeth. A tensile member is embedded in the body. For cast belts, the layered fabric preferably includes an impervious thermoplastic layer at an exterior surface of the twined fabric. The thermoplastic layer is useful in conjunction with a manufacturing process for a belt having a polymeric body of a castable urethane material. Optionally, more than one twined fabric layers may be used in conjunction with one or more layers of non-woven fabric material.

An object of the invention is to provide a belt reinforcing material for a power transmission belt.

Another object of the invention is to provide a belt construction with an improved wear-resistant fabric that exhibits improved belt tooth reinforcement and positioning of a non-woven fabric during belt manufacture.

Another object of the invention is to provide a belt with a layer of non-woven material that is located and positioned in a belt tooth for enhancing reinforcement of the belt tooth.

An advantage of the invention is that a non-woven fabric can be placed in a mold so that it will be in a desired proper position within a tooth of a formed belt. These and other objects and advantages of the invention will be apparent after reviewing the drawings and detailed description thereof wherein.

Figure 2:
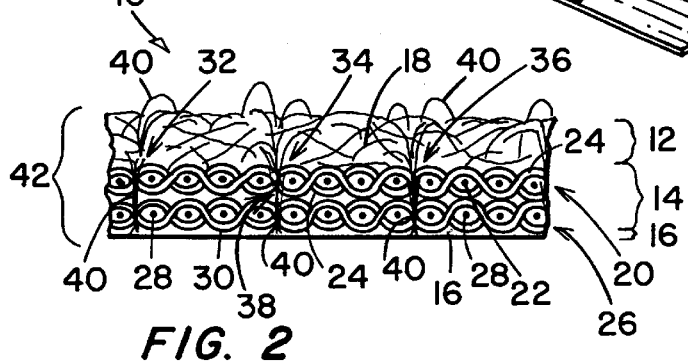
FIG. 2 is an enlarged cross section of fabric taken along the line 2—2 of FIG. 1.
Figure 3:
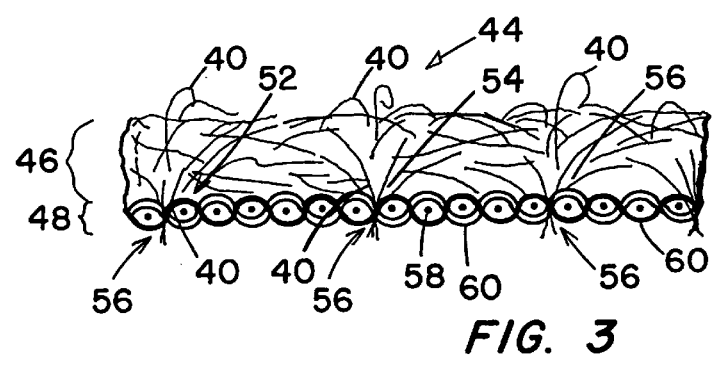
Figure 4:
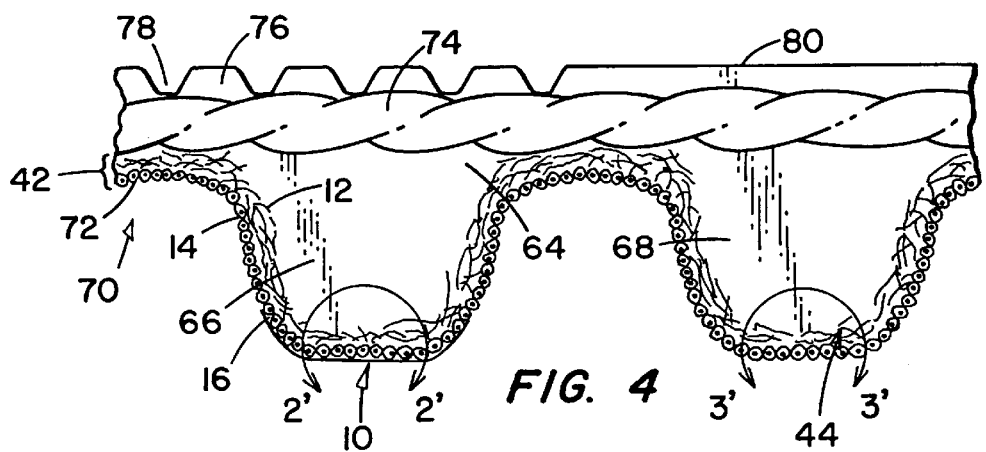

FIG. 3 is a view similar to that of FIG. 2 but showing an alternate form of a fabric of the invention; and FIG. 4 is an enlarged fragmentary longitudinal view of a side of a toothed belt of the invention with depicted alternate embodiments and wherein a view taken along the line 2'—2' is a view of fabric similar to FIG. 2, and a view taken along the line 3'—3' is a view of fabric similar to FIG. 3.

DESCRIPTION OF PREFERRED EMBODIMENT

Figure 1:
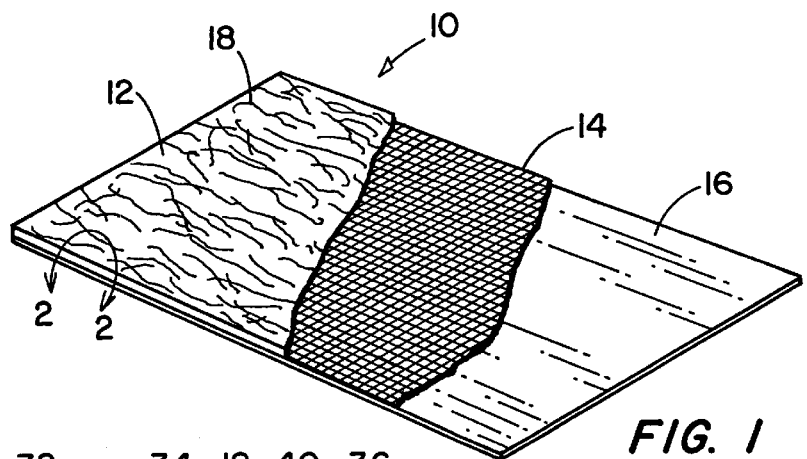
FIG. 1 is a perspective view showing a layered fabric of the invention.

Referring to FIGS. 1 and 2, a belt reinforcement fabric 10 has a non-woven fabric layer 12, a twined fabric layer 14, and optionally, and when for a urethane or cast belt, a thermoplastic layer 16. The non-woven fabric layer is made with discontinuous fibers 18 and may be initially in the form of: a web of unbonded discontinuous fibers of the same or different materials; a web of the same or discontinuous fibers of the same or different materials that are bonded together by needle punching; or a web of dissimilar fibers that have been heat bonded to each other in any desired fashion and sheeted into a calendered web of fabric of controlled weight and thickness. A wide range of fiber types may be used for the non-woven fabric such as, for example, nylon, polyester, aramid, polypropylene or a combination thereof, or a combination of nylon and polypropylene fibers where the fibers of the fabric have different melting temperatures so they can be thermally bonded to one another. Examples of fiber bonding include: chemical, thermo/pressure, hydroentangled, needle-punch, chemical/thermal or a composite thereof.

The twined fabric may be of any suitable fabric such as canvas, crimped fabric that is stretchable in at least one direction, leno weave, knit or the like; and made of any desired fiber including aramid, nylon, polyester, rayon, polypropylene and cotton. The twined fabric illustrated in FIG. 2 is of the type disclosed in Dutton 5,362,281 which is a single fabric of a multi-weave type with two sets of warp and weft yarns where in a first woven component 20 has a plurality of warp yarns 22 and a plurality of fill or weft yarns 24. A second woven component 26 has a plurality of warp yarns 28 and weft yarns 30. The woven components are periodically interlaced with tie yarns (not shown) which may be weft or warp yarns. The non-woven fabric is attached to the twined fabric at a plurality of spaced points 32, 34, 36 as is preferably accomplished by needle-punching. A serrated needle of a needle-punch (not shown) hooks fibers of the non-woven fabric or twined fabric or both, and positions the hooked fiber through 38 and into the adjacent fabric layers which entangles fibers 40 and attaches the layers 12, 14 together at spaced points 32, 34, 36.

Needle-punching may be directed from either the non-woven fabric side or the twined fabric side. When an unbonded web of non-woven fabric is chosen, it is preferred that needle-punching take place from the non-woven side because the twined fabric serves as a substrate during the needle-punching operation. However, when a bonded layer of non-woven fabric is chosen, it may be optionally used as a substrate and needle-punching may be directed from the twined fabric side. The number of attachment points must be sufficient to hold the fabric layers sufficiently together during a belt manufacturing process. Also, the number of needle-punches per unit area, commonly referred to as needle-punches per square inch or ppsi, has an impact on the thickness 42 of the composite reinforcement fabric 10. Generally speaking, the higher the density of needle-punching, the thinner the reinforcement fabric. It has been determined hat a needle-punch density from about 100 to about 500 ppsi is satisfactory for attaching the non-woven fabric and twined fabric layers together. To complete the illustrated embodiment of the reinforcement fabric 10, a layer of thermoplastic material 16 is applied and bonded to the outer surface of the twined fabric in known fashion. The thermoplastic material may be of any desired type such as polyethylene and include alloys with other thermoplastic materials as desired to modify friction, increase wear-resistance properties, etc.

Another belt reinforcement fabric 44 of the invention is illustrated in FIG. 3. The fabric is substantially similar to that as shown in FIG. 2 except for a thicker layer 46 of a non-woven fabric and a thinner layer 48 of a twined fabric. A layer of thermoplastic material is optionally excluded. The layers of fabric are attached to each other at a plurality of spaced points 52, 54, 56 by needle-punching. Fibers 56 are pushed through the twined textile fabric which entangles fibers 40 between the fabric holding the fabrics together. The twined fabric is woven in a single layer and has warp yarns 58 and weft yarns 60.

Referring to FIG. 4, a toothed power transmission belt 62 of the invention has a polymeric body 64, a plurality of spaced teeth 66, 68 along at least one surface 70 for engagement with a toothed pulley (not shown), and a wear-resistant fabric 10 or 44 disposed along a periphery 72 that includes the belt teeth.

The polymeric body may be of any desired material which includes, by way of example, natural rubbers, synthetic rubbers, and blends thereof; urethanes such as of the liquid cast or millable gum variety; and thermoplastic such as polyester. For the belt tooth 66, a cast liquid urethane body may be used in combination with fabric 10. A tensile member 74 is embedded in the belt body and may be in the form of a spirally wound cord. The pitch line diameter for the cord is at least partially controlled by the thickness 42 of the fabric. As known in the art, a PLD for a belt can be slightly modified by the winding tension of a tensile member during a belt manufacturing process. Optionally, ribs 76 and grooves 78 may be formed on an opposite side of the belt for enhanced flexibility. However, and in some applications, it may be desired for the belt to have a flat surface 80 for engagement with pulleys (not shown).

The embedded tensile member 74 is of the endless type such as a spirally wound cord and is made from a material with minimum elongation such as fiberglass, aramid, and carbon fiber. The profile of the belt teeth may be of any desired configuration such as trapezoidal, or with curvilinear flank surfaces such as those shown in U.S. Pat. Nos. 3,756, 091 (Miller), 4,605,389 (Westhoff), or 4,515,577 (Cathey et al.). The belt tooth profile of FIG. 4 has flanks of the curvilinear type.

The non-woven fabric layer, being attached to the twined fabric layer, conforms to the peripheral surface including the belt teeth. By following the contour of the belt teeth, the fabric is in a position to enhance reinforcement of belt teeth. In the case of manufacturing a cast urethane belt, the fabric 10 may be pre-pleated before being placed in a mold, or alternatively, the fabric may be pleated while it is being positioned in a toothed mold. The composite fabric 10, 44 eliminates a need for separately handling a non-woven fabric material and positioning it at a strategic location adjacent to a peripheral belt surface.

In the case of a belt with a rubber body, the fabric is pretreated in known fashion such as by dipping it into a latex or elastomeric material solution for adhesion with the rubber body.

To illustrate the advantages of the features of the invention, 14 mm pitch, curvilinear toothed belts of the invention with polyurethane bodies were tested against similar prior art belts. The belts were constructed in a similar manner except for the wear-resistant fabric. The test conditions for the belts were as follows:

> 60 horsepower
> 32 Toothed sprockets
> T1 + T2 = 1160 lbs.

All tested belts had a fabric with a thermoplastic layer and the textile portion of each fabric is characterized by the following:

| Fabric Description | Fabric Construction | Belt Life Performance |
| --- | --- | --- |
| Prior Art - single ply twined fabric | 13 oz./sq. yd., multi-warp Warp - 210/1 dtex × 118 Count Fill-70/6 dtex × 96 count | 25.5 hrs. |
| Prior Art - dual twined fabric | 2 ply-8.84 oz./sq. yd., single warp Warp-210/1 dtex × 81 count Fill-70/4 dtex × 74 count | 38 hrs. |
| Invention - twined fabric & nonwoven | 8.84 oz./sq yd. - single warp Warp-210/1 dtex × 81 Count Fill-70/4 dtex × 74 count 330 gm./sq. m - non woven needle density 171 ppsi | 154 hrs. |
| Invention - twined fabric & nonwoven | 13 oz./sq.yd., multi-warp Warp-210/1 dtex × 118 count Fill-70/6 dtex × 96 count 50 gm./sq.m - non woven needle density 240 ppsi | 350 hrs. |

Thus, belts of the invention displayed load lives that were from about 6 to 11 times better than that of the prior art belts having prior art fabric reinforcements.

What is claimed is:

1. A belt reinforcing material comprising two layers of textile fibrous material with portions of one of the layers attached to the other layer and where one of the layers is a twined fabric, and wherein the improvement comprises:
   a non-woven fabric layer of material attached to the layer of twined fabric material by fibers of one layer interlaced by needle punching with fibers of the other layer, and wherein the non-woven fabric layer is a calendered web of heat bonded, non-woven fibrous material.

2. The reinforcing material as claimed in claim 1 wherein the non-woven fabric layer is a web of non-woven fibrous material.

3. The reinforcing material as claimed in claim 1 wherein the twined fabric layer is selected from the group consisting of a woven fabric and a knit fabric.

4. The reinforcing material as claimed in claim 1 wherein the needle-punching is at a density from about 100 to 500 ppsi.

5. A belt reinforcing material comprising two layers of textile fibrous material with portions of one of the layers attached to the other layer and where one of the layers is a twined fabric, and wherein the improvement comprises:
   a non-woven fabric layer of material attached to the layer of twined fabric material by fibers of one layer interlaced by needle punching with fibers of the other layer; and
   a layer of thermoplastic material bonded to an exterior facing surface of the twined fabric material.

6. A toothed belt having a belt body formed primarily of an elastomer and a plurality of belt teeth attached to the belt body, the belt teeth also reinforced with a multi-layer composite reinforcing material comprising a first layer of fibrous twined fabric material positioned at a peripheral edge of the belt teeth, a second layer of non-woven fibrous fabric material attached to the first layer wherein fibers of one of said first or second layers are interlaced with the fibers of the other layer, and the second layer is contained within and reinforces the belt teeth.

7. A belt as claimed in claim 6 wherein the reinforcing material is disposed along a peripheral edge of the belt that includes the belt teeth.

8. A belt as claimed in claim 6 including a belt body primarily formed of a polymer selected from the group consisting of rubber, urethane and thermoplastic.

9. A belt as claimed in claim 6 in which the first layer of twined fabric is attached to the second layer of non-woven fibrous fabric material by needle punching.

10. A toothed belt with a belt body primarily formed of a urethane elastomer and reinforced with a layer of textile fibrous material at a peripheral edge that includes the belt teeth, the improvement in the fibrous material comprising:
    a non-woven fabric layer of material attached to a layer of woven material by fibers of one layer interlaced by needle punching with fibers of the other layer; and
    a layer of thermoplastic material bonded to the layer of woven material and externally exposed along the peripheral edge.

11. The reinforcing material as claimed in claim 10 wherein the needle-punching density is from about 100 to 500 ppsi.

12. The reinforcing material as claimed in claim 10 wherein the layer of a non-woven fabric material is a web of non-woven fibrous material.

13. The reinforcing material as claimed in claim 10 wherein the non-woven layer is a calendered web of heat bonded, non-woven fibrous material.

14. A toothed belt having a belt body formed primarily of an elastomer and a plurality of belt teeth attached to the belt body, the belt teeth also formed primarily of an elastomer and reinforced along their peripheral edge with a multi-layer composite reinforcing material, the reinforcing material comprising a first layer of woven fibrous material, a second layer of non-woven fibrous fabric material attached to the first layer at a plurality of spaced points, and wherein fibers of the second non-woven fibrous fabric material are embedded within the elastomer of the belt teeth.

15. A belt as claimed in claim 14 wherein the first layer of woven fabric material and second layer of non-woven fibrous fabric material are attached at a plurality of spaced points by needle punching whereby fibers of the first and second layers are interlaced together.

16. A belt as claimed in claim 14 wherein the second layer of non-woven fibrous fabric material is a calendered web of heat bonded, non-woven fibrous material.

17. A belt as claimed in claim 14 wherein the multi-layer composite reinforcing material further includes a layer of thermoplastic material bonded to the first layer of woven fibrous material so as to be externally exposed along the peripheral edge of the belt teeth, and the elastomers of the belt body and teeth is a polymer of urethane.

18. A belt as claimed in claim 14 wherein the elastomer of the belt body and belt teeth are formed of a polymer selected from the group consisting of rubber, urethane and thermoplastic.

* * * * *